US008269862B2

(12) United States Patent
Sasaki

(10) Patent No.: US 8,269,862 B2
(45) Date of Patent: Sep. 18, 2012

(54) IMAGE PROCESSING APPARATUS AND IMAGE PROCESSING METHOD

(75) Inventor: Hiroshi Sasaki, Hachioji (JP)

(73) Assignee: Olympus Corporation, Tokyo (JP)

(*) Notice: Subject to any disclaimer, the term of this patent is extended or adjusted under 35 U.S.C. 154(b) by 310 days.

(21) Appl. No.: 12/696,133

(22) Filed: Jan. 29, 2010

(65) Prior Publication Data
US 2010/0194933 A1 Aug. 5, 2010

(30) Foreign Application Priority Data

Feb. 2, 2009 (JP) ................................ 2009-021813

(51) Int. Cl.
H04N 5/217 (2011.01)
G06K 9/40 (2006.01)
(52) U.S. Cl. ........................................ 348/241; 382/260
(58) Field of Classification Search .................. 348/241; 382/260
See application file for complete search history.

(56) References Cited

U.S. PATENT DOCUMENTS

| 7,643,696 | B2 | 1/2010 | Kita |
| 2007/0009175 | A1 | 1/2007 | Lim et al. |
| 2007/0177816 | A1* | 8/2007 | Yoo et al. ....................... 382/264 |
| 2009/0010561 | A1* | 1/2009 | Lee ................................ 382/260 |
| 2009/0219417 | A1* | 9/2009 | Tsuruoka ....................... 348/241 |

FOREIGN PATENT DOCUMENTS

| JP | 6-062283 A | 3/1994 |
| JP | 2006-302023 A | 11/2006 |
| JP | 2006-229749 A | 8/2008 |
| WO | WO-2008/056565 | * 5/2008 |

OTHER PUBLICATIONS

U.S. Appl. No. 12/696,162; First Named Inventor: Hiroshi Sasaki; Title: "Image Processing Apparatus and Image Processing Method"; Filed: Jan. 29, 2010.

* cited by examiner

Primary Examiner — Tuan Ho
Assistant Examiner — Shahbaz Nazrul
(74) Attorney, Agent, or Firm — Holtz, Holtz, Goodman & Chick, PC

(57) ABSTRACT

The image processing apparatus according to the present invention includes a pixel extraction section that extracts an extraction region made up of a target pixel and a plurality of pixels included in a region peripheral to the target pixel, a similitude calculation section that calculates similitude of each pixel value in the peripheral region with respect to a pixel value of the target pixel, a similitude filter processing section that performs filter processing on the similitude, a first filter determining section that determines a first filter used in the filter processing of the similitude filter processing section, a second filter determining section that determines a second filter used for the extraction region based on the similitude subjected to the filter processing by the similitude filter processing section, and a noise reduction processing section that performs noise reduction processing on the target pixel based on the second filter determined by the second filter determining section.

16 Claims, 11 Drawing Sheets

FIG.7A

| $D_{00}$ | $D_{01}$ | $D_{02}$ | $D_{03}$ | $D_{04}$ | $D_{05}$ | $D_{06}$ |
|---|---|---|---|---|---|---|
| $D_{10}$ | $D_{11}$ | $D_{12}$ | $D_{13}$ | $D_{14}$ | $D_{15}$ | $D_{16}$ |
| $D_{20}$ | $D_{21}$ | $D_{22}$ | $D_{23}$ | $D_{24}$ | $D_{25}$ | $D_{26}$ |
| $D_{30}$ | $D_{31}$ | $D_{32}$ | $D_{33}$ | $D_{34}$ | $D_{35}$ | $D_{36}$ |
| $D_{40}$ | $D_{41}$ | $D_{42}$ | $D_{43}$ | $D_{44}$ | $D_{45}$ | $D_{46}$ |
| $D_{50}$ | $D_{51}$ | $D_{52}$ | $D_{53}$ | $D_{54}$ | $D_{55}$ | $D_{56}$ |
| $D_{60}$ | $D_{61}$ | $D_{62}$ | $D_{63}$ | $D_{64}$ | $D_{65}$ | $D_{66}$ |

EXTRACTION REGION

POSITION OF PIXEL TO BE PROCESSED $D'(x, y)$

FIG.7B

| 0 | 0 | 0 |
|---|---|---|
| 0 | 1 | 0 |
| 0 | 0 | 0 |

FIG.7C

| 1/16 | 2/16 | 1/16 |
|---|---|---|
| 2/16 | 4/16 | 2/16 |
| 1/16 | 2/16 | 1/16 |

FIG.9A

| $D_{00}$ | $D_{01}$ | $D_{02}$ | $D_{03}$ | $D_{04}$ |
|---|---|---|---|---|
| $D_{10}$ | $D_{11}$ | $D_{12}$ | $D_{13}$ | $D_{14}$ |
| $D_{20}$ | $D_{21}$ | $D_{22}$ | $D_{23}$ | $D_{24}$ |
| $D_{30}$ | $D_{31}$ | $D_{32}$ | $D_{33}$ | $D_{34}$ |
| $D_{40}$ | $D_{41}$ | $D_{42}$ | $D_{43}$ | $D_{44}$ |

FIG.9B

| $F_{00}$ | $F_{01}$ | $F_{02}$ | $F_{03}$ | $F_{04}$ |
|---|---|---|---|---|
| $F_{10}$ | $F_{11}$ | $F_{12}$ | $F_{13}$ | $F_{14}$ |
| $F_{20}$ | $F_{21}$ | $F_{22}$ | $F_{23}$ | $F_{24}$ |
| $F_{30}$ | $F_{31}$ | $F_{32}$ | $F_{33}$ | $F_{34}$ |
| $F_{40}$ | $F_{41}$ | $F_{42}$ | $F_{43}$ | $F_{44}$ |

FIG.9C

| $F_{00}$ | $F_{01}$ | $F_{02}$ | $F_{03}$ | $F_{04}$ |
|---|---|---|---|---|
| $F_{10}$ | $F_{11}$ | $F_{12}$ | $F_{13}$ | $F_{14}$ |
| $F_{20}$ | $F_{21}$ | $F_{22}$ | $F_{23}$ | $F_{24}$ |
| $F_{30}$ | $F_{31}$ | $F_{32}$ | $F_{33}$ | $F_{34}$ |
| $F_{40}$ | $F_{41}$ | $F_{42}$ | $F_{43}$ | $F_{44}$ |

FIG.10A

| $D_{00}$ | $D_{01}$ | $D_{02}$ | $D_{03}$ | $D_{04}$ |
|---|---|---|---|---|
| $D_{10}$ | $D_{11}$ | $D_{12}$ | $D_{13}$ | $D_{14}$ |
| $D_{20}$ | $D_{21}$ | $D_{22}$ | $D_{23}$ | $D_{24}$ |
| $D_{30}$ | $D_{31}$ | $D_{32}$ | $D_{33}$ | $D_{34}$ |
| $D_{40}$ | $D_{41}$ | $D_{42}$ | $D_{43}$ | $D_{44}$ |

FIG.10B

| $F_{00}$ | $F_{01}$ | $F_{02}$ | $F_{03}$ | $F_{04}$ |
|---|---|---|---|---|
| $F_{10}$ | $F_{11}$ | $F_{12}$ | $F_{13}$ | $F_{14}$ |
| $F_{20}$ | $F_{21}$ | $F_{22}$ | $F_{23}$ | $F_{24}$ |
| $F_{30}$ | $F_{31}$ | $F_{32}$ | $F_{33}$ | $F_{34}$ |
| $F_{40}$ | $F_{41}$ | $F_{42}$ | $F_{43}$ | $F_{44}$ |

FIG.10C

| $F_{00}$ | $F_{01}$ | $F_{02}$ | $F_{03}$ | $F_{04}$ |
|---|---|---|---|---|
| $F_{10}$ | $F_{11}$ | $F_{12}$ | $F_{13}$ | $F_{14}$ |
| $F_{20}$ | $F_{21}$ | $F_{22}$ | $F_{23}$ | $F_{24}$ |
| $F_{30}$ | $F_{31}$ | $F_{32}$ | $F_{33}$ | $F_{34}$ |
| $F_{40}$ | $F_{41}$ | $F_{42}$ | $F_{43}$ | $F_{44}$ |

FIG.13A

| 0 | 0 | 0 |
|---|---|---|
| 0 | 1 | 0 |
| 0 | 0 | 0 |

FIG.13B

| 0 | 0 | 0 |
|---|---|---|
| 1 | 2 | 1 |
| 0 | 0 | 0 |

FIG.13C

| 1 | 0 | 0 |
|---|---|---|
| 0 | 2 | 0 |
| 0 | 0 | 1 |

FIG.13D

| 0 | 1 | 0 |
|---|---|---|
| 0 | 2 | 0 |
| 0 | 1 | 0 |

FIG.13E

| 0 | 0 | 1 |
|---|---|---|
| 0 | 2 | 0 |
| 1 | 0 | 0 |

IMAGE PROCESSING APPARATUS AND IMAGE PROCESSING METHOD

This application claims benefit of Japanese Patent Application No. 2009-021813 filed in Japan on Feb. 2, 2009, the entire contents of which are incorporated herein by this reference.

BACKGROUND OF THE INVENTION

1. Field of the Invention

The present invention relates to an image processing apparatus and an image processing method, and more particularly, to an image processing apparatus and an image processing method that perform noise reduction processing on an image signal.

2. Description of Related Art

Generally, an image pickup apparatus provided with an image pickup device such as a CCD or CMOS photoelectrically converts an image optically formed on an image pickup plane via lenses in micro regions pixel by pixel and thereby outputs an image signal as an electric signal. Furthermore, the aforementioned image signal is amplified by an amplifier to a predetermined brightness level, digitized by an A/D converter and subjected to further processing as a digital image.

Various types of noise ascribable to the image pickup device are mixed into the digital image digitized as described above. Examples of the above described noise include dark current, fixed pattern noise caused by a variation in gain of the amplifier accompanying a variation of each pixel and random noise as shot noise caused by statistical nature at the time of photoelectric conversion. Furthermore, the statistical characteristic of the aforementioned noise is known to vary with the brightness level. Shot noise in particular has average amplitude proportional to the square root of the brightness level.

On the other hand, for example, processing by a spatial smoothing filter using spatial correlativity of the image signal and spatial non-correlativity of noise is widely known as processing that reduces the noise level of a digital image into which noise originating in the image pickup device is mixed and can thereby improve an SN ratio. However, the spatial smoothing filter often has an adverse effect on an edge section of the image. Therefore, Japanese Patent Application Laid-Open Publication No. 2006-302023 describes a noise reduction method using such an edge-preserving filter that a weighting factor of a smoothing filter adaptively varies between an edge section and parts other than the edge section of the image.

The noise reduction filter according to Japanese Patent Application Laid-Open Publication No. 2006-302023 is a filter that adaptively changes weights according to a difference in pixel values between a target pixel to be processed within a target region and a pixel peripheral thereto. To be more specific, the noise reduction filter according to Japanese Patent Application Laid-Open Publication No. 2006-302023 reduces the weight to 0 when the absolute value of the aforementioned difference value is above a threshold SH, and is configured on the other hand, when the absolute value of the aforementioned difference value is equal to or below the threshold SH, using a filter coefficient whereby the absolute value of the difference value is converted to a weight using a function that monotonously decreases down to a predetermined value as the absolute value of the aforementioned difference value increases from 0 and monotonously increases when the absolute value of the aforementioned difference value reaches or exceeds the predetermined value. Using such a filter designed based on the difference value between the target pixel and the pixel peripheral thereto makes it possible to suppress noise in a flat part while preserving the edge section of the image.

Furthermore, as the adaptive smoothing filter, the weight of which adaptively varies according to the structure of an image, there are, for example, filters called a "rational filter" and a "bilateral filter" expressed by following equation (1).

$$F(x,y) = N \cdot \exp\{-(|\text{spatial distance}(x,y)|/\sigma_s)^2/2\} \cdot \exp\{-(|\text{pixel value difference}(x,y)|/\sigma_d)^2/2\} \quad (1)$$

As shown in equation (1) above, the bilateral filter has a filter coefficient obtained by multiplying a Gaussian filter corresponding to a spatial distance by a Gaussian filter corresponding to a pixel value difference. The first term of the right side of equation (1) above indicates that a fixed weight independent of the structure of an image is given and the second term of the right side in equation (1) above indicates that a weight that adaptively varies depending on the structure of the image is given.

The bilateral filter expressed by equation (1) above operates so as to exclude pixels having a large difference in pixel values between the pixel to be processed and a pixel peripheral thereto from smoothing processing as much as possible, and therefore never blunts edge sections having large differences in pixel value. As a result, the bilateral filter expressed by equation (1) above can reduce a large amount of noise while maintaining resolution, and can thereby obtain an effective noise reduction result.

The second term of the right side of equation (1) above indicates that the difference in pixel values used for smoothing is a difference on the order of $\sigma_d$ at most. When the value of this $\sigma_d$ is fixed, a selection criterion of pixels used for smoothing becomes constant within the image. However, the amount of noise originating in the image pickup device varies depending on the brightness level as described above. Therefore, fixing value of $\sigma_d$ is inconvenient when the processing is actually performed. In consideration of such circumstances, a technique of changing the value of $\sigma_d$ of the second term of the right side according to the amount of noise generated in the bilateral filter expressed as equation (1) above is described in U.S. Patent Application Publication No. 2007/0009175.

U.S. Patent Application Publication No. 2007/0009175 describes a technique of storing a standard deviation value, which is an amount of noise determined according to the brightness level and measured beforehand as a table, outputting an amount of estimated noise with respect to the brightness level of the pixel to be processed and causing the value of $\sigma_d$ to correspond to the amount of estimated noise. According to such a technique described in U.S. Patent Application Publication No. 2007/0009175, it is possible to design a filter weight adaptable not only to a spatial structure of an image but also to the brightness level, and thereby obtain an effective noise reduction result without crushing even a smaller edge structure.

On the other hand, a rational filter expressed as equation (2) below does not crush the micro structure so much as the aforementioned bilateral filter.

$$F(x,y) = T/(|\text{pixel value difference}| + T) \quad (2)$$

In the case of the rational filter expressed as equation (2) above, T is the parameter that corresponds to $\sigma_d$ above.

SUMMARY OF THE INVENTION

The image processing apparatus according to the present invention includes a pixel extraction section that extracts an extraction region made up of a target pixel and a plurality of pixels included in a region peripheral to the target pixel, a similitude calculation section that calculates similitude of each pixel value in the peripheral region with respect to a pixel value of the target pixel, a similitude filter processing section that performs filter processing on the similitude, a first filter determining section that determines a first filter used in the filter processing of the similitude filter processing section, a second filter determining section that determines a second filter used for the extraction region based on the similitude subjected to the filter processing by the similitude filter processing section, and a noise reduction processing section that performs noise reduction processing on the target pixel based on the second filter determined by the second filter determining section.

The image processing method according to the present invention includes a pixel extracting step of extracting an extraction region made up of a target pixel and a plurality of pixels included in a region peripheral to the target pixel, a similitude calculating step of calculating similitude of each pixel value in the peripheral region with respect to a pixel value of the target pixel, a similitude filter processing step of performing filter processing on the similitude, a first filter determining step of determining a first filter used for the filter processing in the similitude filter processing step, a second filter determining step of determining a second filter used for the extraction region based on the similitude subjected to the filter processing in the similitude filter processing step, and a noise reduction processing step of performing noise reduction processing on the target pixel based on the second filter determined in the second filter determining step.

BRIEF DESCRIPTION OF THE DRAWINGS

FIG. 7A is a diagram schematically illustrating filter processing on the difference values between pixel values in an extraction region;

FIG. 7B is a diagram illustrating an example of filter coefficients when the extraction region is processed;

FIG. 7C is a diagram illustrating an example different from FIG. 7B of filter coefficients when the extraction region is processed;

FIG. 9A is a diagram schematically illustrating the difference values between pixel values when high frequency noise is superimposed on a flat region of 5×5 pixels;

FIG. 9B is a diagram schematically illustrating filter coefficients calculated using the difference values between pixel values in the filter used for the region in FIG. 9A;

FIG. 9C is a diagram schematically illustrating filter coefficients obtained by operating a low pass filter for cutting high frequency noise included in the difference values between pixel values in the filter used for the region in FIG. 9A;

FIG. 10A is a diagram schematically illustrating the difference values between pixel values when high frequency noise is superimposed on a flat region of 5×5 pixels;

FIG. 10B is a diagram schematically illustrating filter coefficients calculated using the difference values between pixel values in the filter used for the region in FIG. 10A;

FIG. 10C is a diagram schematically illustrating filter coefficients obtained by operating a low pass filter for cutting high frequency noise included in the difference values between pixel values in the filter used for the region in FIG. 10A;

FIG. 13A is a diagram illustrating an example of filter coefficients used in the difference extraction region filter processing section in FIG. 12;

FIG. 13B is a diagram illustrating an example different from FIG. 13A of filter coefficients used in the difference extraction region filter processing section in FIG. 12;

FIG. 13C is a diagram illustrating an example different from FIG. 13A and FIG. 13B of filter coefficients used in the difference extraction region filter processing section in FIG. 12;

FIG. 13D is a diagram illustrating an example different from FIG. 13A, FIG. 13B and FIG. 13C of filter coefficients used in the difference extraction region filter processing section in FIG. 12;

FIG. 13E is a diagram illustrating an example different from FIG. 13A, FIG. 13B, FIG. 13C and FIG. 13D of filter coefficients used in the difference extraction region filter processing section in FIG. 12.

DETAILED DESCRIPTION OF PREFERRED EMBODIMENTS

Hereinafter, embodiments of the present invention will be described with reference to the accompanying drawings.

First Embodiment

Figure 1:
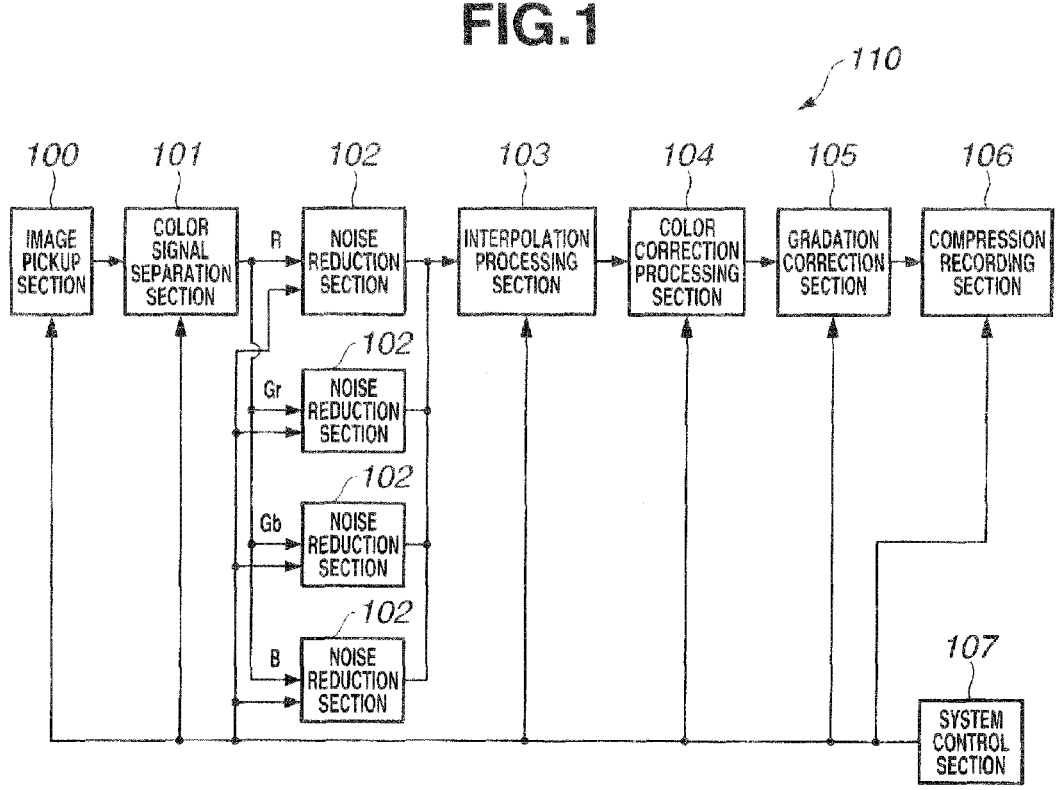
FIG. 1 is a function block diagram illustrating a configuration of main parts of an image processing apparatus according to an embodiment of the present invention.
Figure 2:
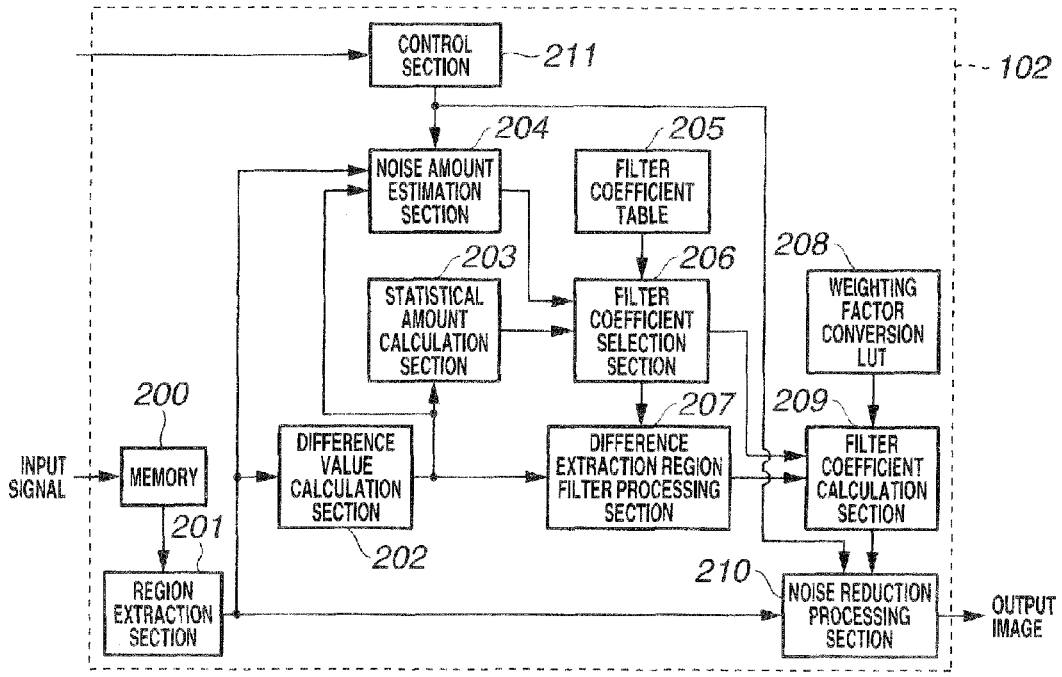
FIG. 2 is a function block diagram illustrating an example of a specific configuration of the noise reduction section in the image processing apparatus in FIG. 1.
Figure 3:
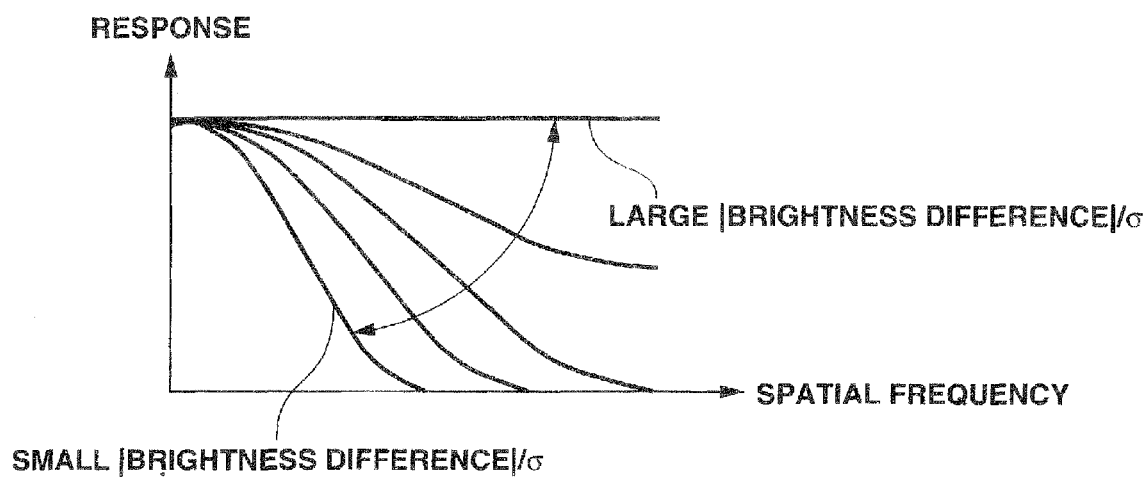
FIG. 3 is a diagram illustrating an example of a frequency characteristic of a bilateral filter.
Figure 4:
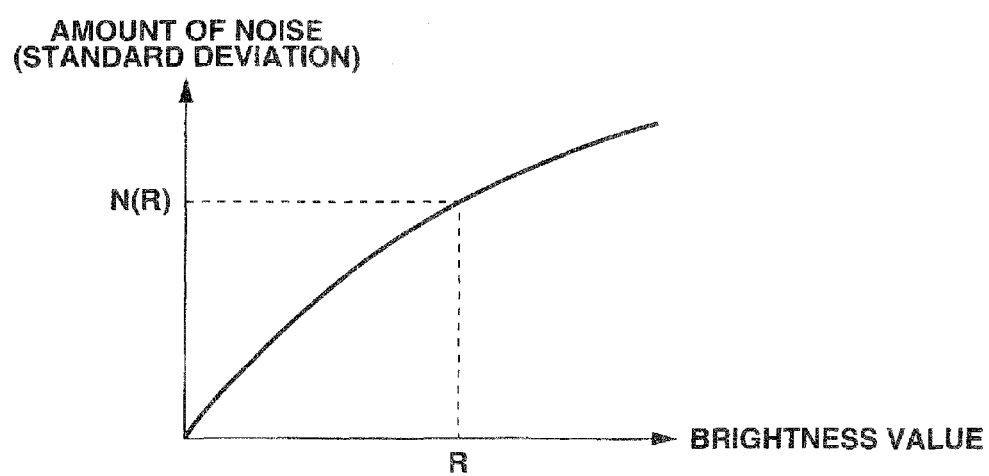
FIG. 4 is a diagram illustrating an example of a relationship between a brightness value and an amount of noise superimposed on a pixel.
Figure 5:
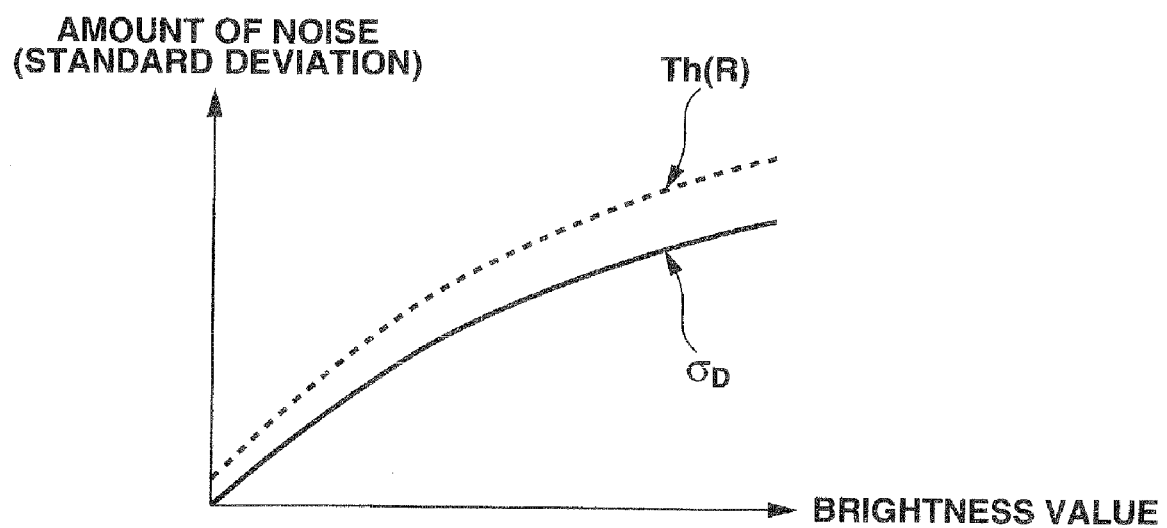
FIG. 5 is a diagram illustrating an example of a relationship between a selection threshold of a filter type for processing difference values between pixel values and an amount of noise.

FIG. 1 to FIG. 11 are related to a first embodiment of the present invention. FIG. 1 is a function block diagram illustrating a configuration of main parts of an image processing apparatus according to an embodiment of the present invention. FIG. 2 is a function block diagram illustrating an example of a specific configuration of the noise reduction section of the image processing apparatus in FIG. 1. FIG. 3 is a diagram illustrating an example of a frequency characteristic of a bilateral filter. FIG. 4 is a diagram illustrating an example of a relationship between a brightness value and an amount of noise superimposed on a pixel. FIG. 5 is a diagram illustrating an example of a relationship between a selection threshold of a filter type for processing difference values between pixel values and an amount of noise. FIG. 6A is a schematic view illustrating an example of a frequency characteristic before and after filter processing of the difference values between pixel values. FIG. 6B is a schematic view illustrating an example different from FIG. 6A of a frequency characteristic before and after filter processing of the difference values between pixel values. FIG. 7A is a diagram schematically illustrating filter processing on the difference values between pixel values in an extraction region. FIG. 7B is a diagram illustrating an example of filter coefficients when the extraction region is processed. FIG. 7C is a diagram illustrating an example different from FIG. 7B of filter coefficients when the extraction region is processed.

Figure 8:
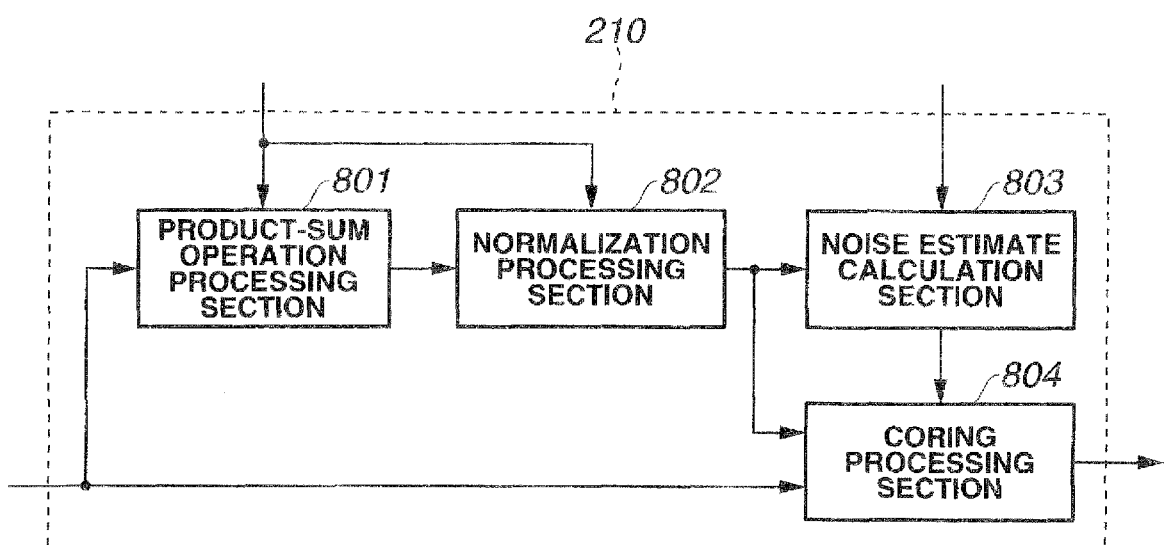
FIG. 8 is a function block diagram illustrating an example of a specific configuration of the noise reduction processing section.
Figure 11:
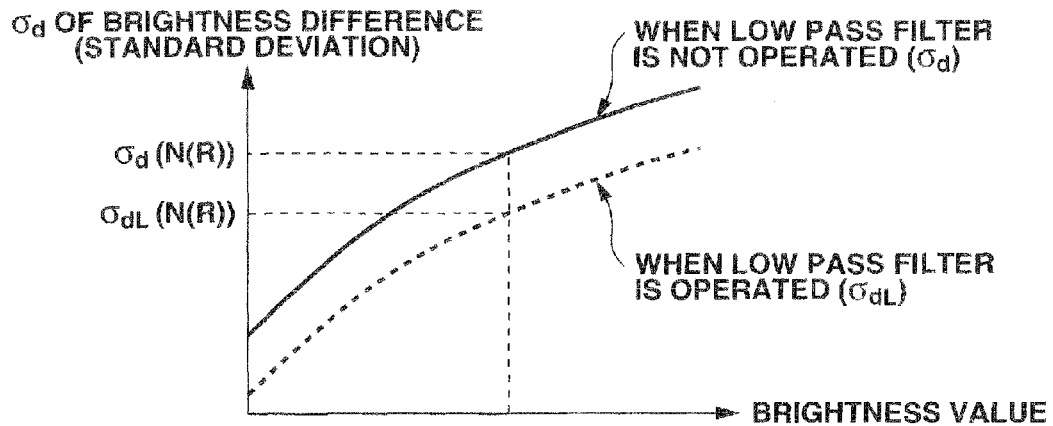
FIG. 11 is a diagram illustrating a relationship between two types of coefficient values to normalize the difference values between pixel values of a bilateral filter.

FIG. 8 is a function block diagram illustrating an example of a specific configuration of the noise reduction processing section. FIG. 9A is a diagram schematically illustrating the difference values between pixel values when high frequency noise is superimposed on a flat region of 5×5 pixels. FIG. 9B is a diagram schematically illustrating filter coefficients calculated using the difference values between pixel values in the filter used for the region in FIG. 9A. FIG. 9C is a diagram schematically illustrating filter coefficients obtained by operating a low pass filter for cutting high frequency noise included in the difference values between pixel values in the filter used for the region in FIG. 9A. FIG. 10A is a diagram schematically illustrating the difference values between pixel values when high frequency noise is superimposed on a flat region of 5×5 pixels. FIG. 10B is a diagram schematically illustrating filter coefficients calculated using the difference values between pixel values in the filter used for the region in FIG. 10A. FIG. 10C is a diagram schematically illustrating filter coefficients obtained by operating a low pass filter for cutting high frequency noise included in the difference values between pixel values in the filter used for the region in FIG. 10A. FIG. 11 is a diagram illustrating a relationship between two types of coefficient values to normalize the difference values between pixel values of a bilateral filter.

As shown in FIG. 1, an image processing apparatus 110 is configured by including an image pickup section 100, a color signal separation section 101, a plurality of noise reduction sections 102, an interpolation processing section 103, a color correction processing section 104, a gradation correction section 105, a compression recording section 106 and a system control section 107.

The image pickup section 100 is configured by including a lens and an image pickup device (not shown). An image formed on the image pickup device via the lens of the image pickup section 100 is photoelectrically converted and outputted as an analog signal. The analog signal is then amplified by an amplification section (not shown), converted to digital data by an A/D conversion section (not shown) and then outputted to the color signal separation section 101.

In the present embodiment, the image pickup device of the image pickup section 100 will be described on the premise of a Bayer array of single device with RGB primary color filters arranged in a checkered pattern on a chip of CCD or CMOS sensor or the like, one color arranged on each pixel, but the image pickup device is not limited to such an array. To be more specific, the image pickup device of the image pickup section 100 may have a multi configuration including a plurality of monochrome image pickup devices and a dichroic prism and forming images of light rays color-separated via the dichroic prism on the respective image pickup devices. In this case, a signal separated by the color signal separation section 101, which will be presented below, is different and the interpolation processing section 103 becomes unnecessary. Furthermore, the image pickup device of the image pickup section 100 may have a configuration adaptable to multibands by combining the aforementioned two types of configuration.

The color signal separation section 101 separates digital data from the image pickup section 100 into portions for R, Gr, Gb and B pixel signals. The color signal separation section 101 then applies white balance processing to the respective separated pixel signals, multiplies the R signal and B signal by the gain for the G signal and then outputs the four color signals to their corresponding noise reduction sections 102.

The noise reduction section 102 applies noise reduction processing to each color signal outputted from the color signal separation section 101 and then outputs each color signal after the noise reduction processing to the interpolation processing section 103.

For a color signal having only one color per pixel, the interpolation processing section 103 uses pixel values of the same color and a different color in pixels peripheral to the one pixel to create interpolation signals of two colors, which do not exist in the one pixel. Through such processing, the interpolation processing section 103 generates a synchronized RGB signal having three color signals per pixel and outputs the RGB signal to the color correction processing section 104.

The color correction processing section 104 performs processing of converting the RGB signal in a device color space ascribable to characteristics of the image pickup section 100 as the output signal from the interpolation processing section 103 to a color region (e.g., sRGB) of a monitor or the like to which the signal is outputted. The color correction processing section 104 then outputs the RGB signal subjected to the processing to the gradation correction section 105.

The gradation correction section 105 applies gradation conversion processing corresponding to the characteristics of the monitor or the like, to which the signal is outputted, to the RUB signal from the color correction processing section 104 and outputs the RGB signal after the gradation conversion processing to the compression recording section 106.

The compression recording section 106 converts the RGB signal from the gradation correction section 105 to a YCbCr signal which is a brightness color difference signal, applies high efficiency compression processing such as JPEG or MPEG to the YCbCr signal and then records the signal after the high efficiency compression processing in a recording medium.

The system control section 107 outputs control signals for allowing the aforementioned respective sections to functionally operate processing in the image processing apparatus 110 as a whole. That is, the respective sections of the image processing apparatus 110 operate based on control signals outputted from the system control section 107 respectively.

Here, a specific configuration of the noise reduction section 102 will be described.

As shown in FIG. 2, the noise reduction section 102 is configured by including a memory 200, a region extraction section 201, a difference value calculation section 202, a statistical amount calculation section 203, a noise amount estimation section 204, a filter coefficient table 205, a filter coefficient selection section 206, a difference extraction region filter processing section 207, a weighting factor conversion LUT 208, a filter coefficient calculation section 209, a noise reduction processing section 210 and a control section 211.

The memory 200 receives one type of color signal outputted from the color signal separation section 101 as image data. The image data is temporarily stored in the memory 200 to absorb a time delay of noise reduction processing.

The region extraction section 201 reads the image data stored in the memory 200 and extracts a target pixel P(x0,y0) on which noise reduction processing is performed and a region image of, for example, 7×7 pixels as a region of a predetermined size including the target pixel P in the center. The region extraction section 201 then outputs the extracted region image to the difference value calculation section 202 and the noise amount estimation section 204.

The difference value calculation section 202 calculates a difference value D(x, y) indicating similitude between the target pixel P(x0, y0) located in the center of the region image and a pixel P(x, y) in a region peripheral thereto based on the region image from the region extraction section 201 according to following equation (3).

$$D(x,y)=P(x,y)-P(x0,y0) \quad (3)$$

Here, suppose D(x0, y0)=0 in equation (3) above. Furthermore, hereinafter, the present embodiment will continue following explanations assuming similitude as the difference value D(x, y), but the present invention need not be limited thereto. For example, the similitude may be the absolute value of the difference value D(x, y) or the square value of the difference value D(x, y).

The difference value calculation section 202 outputs the calculated difference value D(x, y) to the statistical amount calculation section 203 and the noise amount estimation section 204 respectively.

The statistical amount calculation section 203 calculates standard deviation $\sigma_D$ corresponding to the difference value D(x, y) from the difference value calculation section 202 and outputs the standard deviation $\sigma_D$ to the filter coefficient selection section 206. The statistical amount calculation section 203 need not necessarily calculate the standard deviation $\sigma_D$ as the statistical amount but may also calculate, for example, a dynamic range of the difference value D(x, y) in the extraction region.

On the other hand, the noise amount estimation section 204 calculates the extraction region of the difference value D(x, y) from the difference value calculation section 202 and one representative brightness value R corresponding to the target pixel P(x0, y0) of the extraction region. The representative brightness value R may be calculated, for example, as D(x0, y0)=P(x0, y0) or calculated as an average value in the extraction region of the difference value D(x, y) added to P(x0, y0) or calculated as a processing result of the bilateral filter expressed as following equations (4), (5) and (6).

$$R=\Sigma_x\Sigma_y\exp\{-S(x,y)^2/(2\sigma_s^2)\}\exp\{-(D(x,y)^2/(2\sigma_d^2)\}\}\cdot\{D(x,y)+P(x0,y0)\}/No \quad (4)$$

$$No=\Sigma_x\Sigma_y\exp\{-S(x,y)^2/(2\sigma_s^2)\}\exp\{-(D(x,y)^2/(2\sigma_d^2)\}\} \quad (5)$$

$$S(x,y)^2=(x-x0)^2+(y-y0)^2 \quad (6)$$

Here, suppose $\Sigma_x$ and $\Sigma_y$ in equations (4) and (5) above indicate the sum totals within a range of values that x and y can take.

The noise amount estimation section 204 converts the representative brightness value R to a noise estimate N(R) by applying the representative brightness value R to the noise model Nm(R) measured beforehand as shown, for example, in FIG. 4.

The noise model Nm(R) in the image pickup apparatus is calculated as a function obtained by applying a least squares method to a polynomial approximate curve obtained by taking images of a plurality of patches which become a uniform brightness region beforehand using a specific image pickup apparatus and then measuring an average brightness value and standard deviation of a predetermined region in each patch. Such a noise model Nm(R) may retain the polynomial coefficient or may be converted to a LUT as line graph data made up of a plurality of points.

The noise estimate N(R) is calculated, for example, by multiplying the aforementioned noise model Nm(R) by a function P of parameters (amount of gain, exposure time, temperature, . . . ) that causes the amount of noise to increase such as an amount of gain, ISO sensitivity, exposure time, temperature of the sensor itself specified by the image pickup section 100 and amount of gain accompanying white balance processing of the color signal separation section 101.

The noise amount estimation section 204 calculates the function P based on the aforementioned respective parameters inputted via the control section 211. Suppose the function P is expressed so as to calculate a function value such as a polynomial or LUT.

Therefore, the noise estimate N(R) is calculated by following equation (7).

$$N(R)=Nm(R)\times P(\text{amount of gain,exposure time,temperature},\ldots) \quad (7)$$

The filter coefficient selection section 206 receives the standard deviation $\sigma_D$ from the statistical amount calculation section 203 and the noise estimate N(R) from the noise amount estimation section 204. The filter coefficient selection section 206 determines a threshold Th(R) based on the noise estimate N(R) and selects one filter from among a plurality of filters stored in the filter coefficient table 205 based on a judgment in magnitude between $\sigma_D$ and Th(R).

As shown in equation (8) below, the threshold Th(R) is calculated as an additional value of the noise estimate N(R) and a predetermined value $\alpha(R)$.

$$Th(R)=N(R)+\alpha(R) \quad (8)$$

As shown in FIG. 5, the threshold Th(R) is set so as to increase its value as the noise estimate N(R) increases with an increase of the noise estimate N(R) in accordance with the brightness value.

Upon detecting $\sigma_D \geq Th(R)$, the filter coefficient selection section 206 selects a first filter corresponding to a structure region with strong edge strength. On the other hand, upon detecting $\sigma_D < Th(R)$, the filter coefficient selection section 206 selects a second filter corresponding to the region of a micro structure or a flat section. Furthermore, the filter coefficient selection section 206 outputs the coefficient value of the selected filter to the difference extraction region filter processing section 207 and outputs filter selection information SW indicating which of the first filter or second filter is selected to the filter coefficient calculation section 209.

Here, a comparison/judgment between the threshold Th(R) and the standard deviation $\sigma_D$ of the extraction region of the difference value D(x, y) means a judgment as to whether or not there is a large edge component with respect to the noise estimate N(R) in the extraction region to be processed. That is, the filter coefficient selection section 206 selectively changes the type of filter operating on the difference value D(x, y) of the extraction region depending on the presence/absence of a large edge.

The filter coefficient table 205 stores filters to be selected by the filter coefficient selection section 206. For example, coefficients in FIG. 7B correspond to the aforementioned first filter and coefficients in FIG. 7C correspond to the aforementioned second filter.

The aforementioned first filter includes a filter characteristic that allows a signal to pass through all bands. On the other hand, the aforementioned second filter has a characteristic equivalent to that of a low pass filter, and cuts high frequency noise together with a structure of a spatially high frequency component.

Figure 6A:
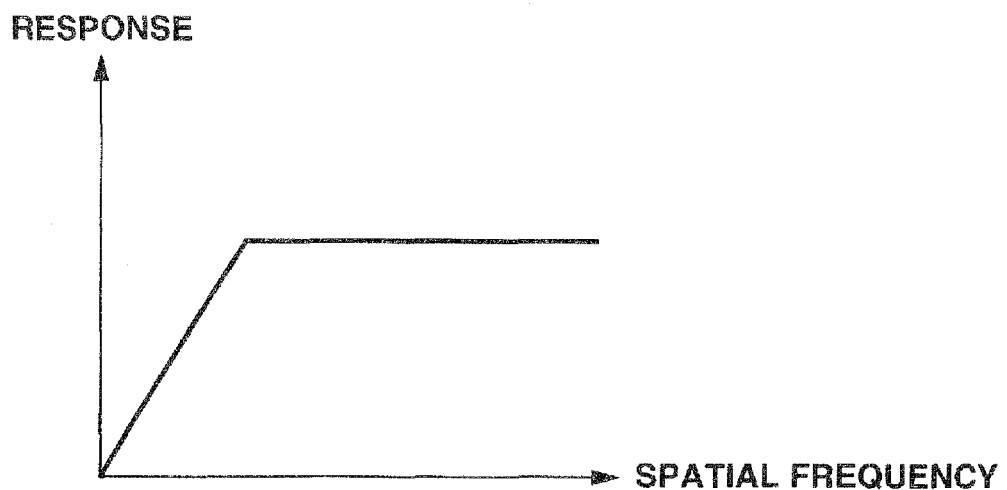
FIG. 6A is a schematic view illustrating an example of a frequency characteristic before and after filter processing of the difference values between pixel values.
Figure 6B:
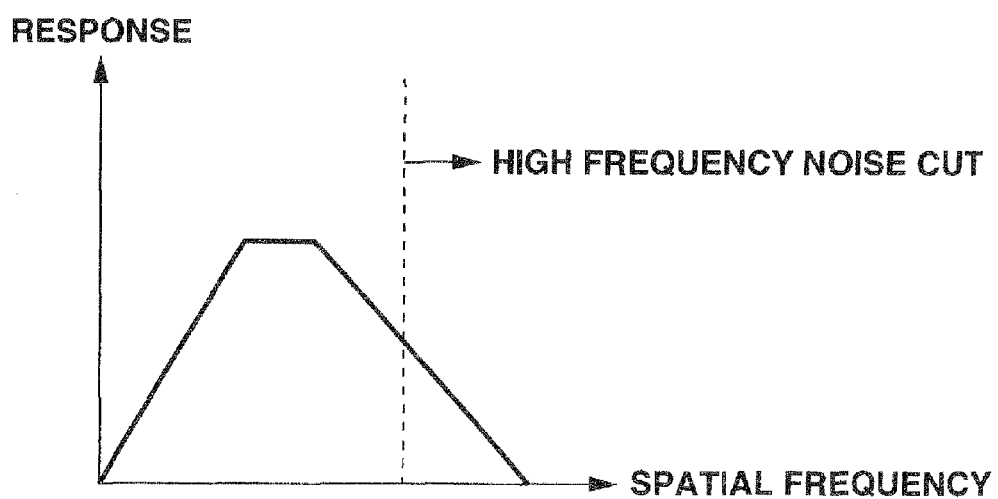
FIG. 6B is a schematic view illustrating an example different from FIG. 6A of a frequency characteristic before and after filter processing of the difference values between pixel values.

That is, when it is judged, as a result of the comparison/judgment between the threshold Th(R) and the standard deviation $\sigma_D$ of the extraction region of the difference value D(x, y), that there is a large edge, the difference value D(x, y) of the extraction region is retained as is, and the spatial frequency characteristic as shown, for example, in FIG. 6A is thereby kept and the edge component included in the difference value D(x, y) of the extraction region is saved. On the other hand, when it is judged as a result of the comparison/judgment between the threshold Th(R) and the standard deviation $\sigma_D$ of the extraction region of the difference value D(x, y), that there is no large edge, a second filter having a characteristic equivalent to that of the low pass filter is made to operate to change the spatial frequency characteristic as shown, for example, in FIG. 6B.

The filter characteristics of the first filter and the second filter stored in the filter coefficient table 205 are not necessarily based on the filter coefficients shown in FIG. 7B and FIG. 7C. To be more specific, the first filter may be configured as a steep low pass filter that attenuates a frequency near the Nyquist frequency while retaining its frequency band as much as possible. In such a configuration, since the noise component near the Nyquist frequency can also be removed using the first filter, the influences of noise on the structure can be reduced. However, in the case of the aforementioned configuration, the filter size of the first filter needs to be set to a size greater than the extraction region of the difference value D(x, y).

The difference extraction region filter processing section 207 applies filter processing to the difference value D(x, y) of the extraction region based on the difference value D(x, y) of the extraction region outputted from the difference value calculation section 202 and the filter coefficient outputted from the filter coefficient selection section 206 and then outputs the processing result to the filter coefficient calculation section 209.

FIG. 7A is a schematic view corresponding to the filter processing on the difference value D(x, y)=$D_{xy}$ of the extraction region. By causing a two-dimensional filter with 3×3 taps shown in FIG. 7B or FIG. 7C to perform convolution processing per pixel on the difference value D(x, y) of the extraction region of 7×7 pixels shown in FIG. 7A, D'(x, y) is obtained as the processing result by the difference extraction region filter processing section 207. The region of D'(x, y) is a region made up of 5×5 pixels around the position of the pixel to be processed of $D_{33}$, obtained by removing a marginal area of one pixel in width that cannot be subjected to filter processing from the extraction region of 7×7 pixels shown, for example, in FIG. 7A.

The filter coefficient calculation section 209 calculates a smoothing processing filter coefficient with respect to the extraction region extracted by the region extraction section 201 based on D'(x, y) outputted from the difference extraction region filter processing section 207 and the filter selection information SW outputted from the filter coefficient selection section 206.

The filter coefficient calculated by the filter coefficient calculation section 209 corresponds to the bilateral filter expressed as following equations (9) and (10) and is provided with 5×5 taps corresponding to the size of D'(x, y).

$$F(x,y)=\exp\{-S(x,y)^2/(2\sigma_s^2)\}\exp\{-(D'(x,y)^2/(2\sigma_d(SW)^2)\} \quad (9)$$

$$S(x,y)^2=(x-x0)^2+(y-y0)^2 \quad (10)$$

The Gaussian function $\exp\{-S(x, y)^2/(2\sigma_s^2)\}$ of the first term of the right side in equation (9) above is a weighting factor based on the spatial distance and can be stored as a table by being calculated beforehand.

On the other hand, the weighting factor conversion LUT 208 stores a conversion table for converting the filter selection information SW to a Gaussian function value corresponding to the Gaussian function $\exp\{-(D'(x, y)^2/(2\sigma_d(SW)^2)\}$ of the second term of the right side in equation (9) above as a plurality of lookup tables $LUT_G$ beforehand. Such a configuration allows the aforementioned Gaussian function value to be obtained by referring to a value of a storage location in the lookup table $LUT_G$ (SW) where the address is D'(x, y).

The filter coefficient calculation section 209 outputs a filter coefficient F(x, y) calculated using the lookup table $LUT_G$ stored in the weighting factor conversion LUT 208 and equations (9) and (10) above to the noise reduction processing section 210. Suppose normalization processing on the filter coefficient F(x, y) calculated by the filter coefficient calculation section 209 will be performed after product-sum operation processing by the noise reduction processing section 210.

Of the extraction region of 7×7 pixels outputted from the region extraction section 201, the noise reduction processing section 210 selects the target pixel P(x0, y0) located in the center of the extraction region and 5×5 pixels peripheral to the target pixel P(x0, y0). After that, the noise reduction processing section 210 performs product-sum operation processing between 5×5 pixels peripheral to the target pixel P(x0, y0) and the filter coefficient of 5×5 taps outputted from the filter coefficient calculation section 209, further calculates the sum total No of the filter coefficients to perform normalization processing and thereby obtains a pixel to be subjected to smoothing processing P'(x0, y0). The noise reduction processing section 210 then outputs the pixel to be subjected to smoothing processing P'(x0, y0) as the processing result as a noise reduction processing output pixel value Po(x0, y0).

Assuming the noise reduction processing section 210 performs processing substantially the same as the aforementioned processing, the noise reduction processing section 210 may have a configuration as shown, for example, in FIG. 8.

The noise reduction processing section 210 is configured by including a product-sum operation processing section 801, a normalization processing section 802, a noise estimate calculation section 803 and a coring processing section 804 as shown in FIG. 8.

The product-sum operation processing section 801 performs product-sum operation processing among the target pixel P(x0, y0) included in the extraction region, P(x, y) made up of 5×5 pixels peripheral to the target pixel P(x0, y0) and filter coefficient F(x, y) with 5×5 taps, and then outputs the product-sum operation processing result P''(x0, y0) to the normalization processing section 802.

The normalization processing section 802 calculates a sum total of the filter coefficient F(x, y); No(SW)$\Sigma_x\Sigma_y$exp$\{-S(x, y)^2/(2\sigma_s^2)\}$exp$\{-(D'(x, y)^2/(2\sigma_d(SW)^2)\}$, converts the calculation result to a reciprocal according to the reciprocal conversion table of No(SW) stored in itself, then multiplies the converted value by the product-sum operation processing result P''(x0, y0) and thereby calculates the pixel to be subjected to smoothing processing P'(x0, y0). The normalization processing section 802 then outputs the calculated pixel to be subjected to smoothing processing P'(x0, y0) to the noise estimate calculation section 803 and the coring processing section 804 respectively.

The noise estimate calculation section 803 calculates a noise estimate N(R) as R=P'(x0, y0) based on the noise model Nm(R) shown in FIG. 4 and image taking condition information (exposure time, amount of gain, ISO sensitivity and sensor temperature or the like) outputted from the control section 211. Here, the noise estimate in the noise estimate calculation section 803 is calculated using the same method as the method described as the explanation of the noise amount estimation section 204. The noise estimate calculation section 803 then outputs the calculated noise estimate N(R) to the coring processing section 804.

The coring processing section 804 obtains a final output pixel value Po(x0, y0) by performing coring processing based on the target pixel P(x0, y0) outputted from the region extraction section 201, the pixel to be subjected to smoothing processing P'(x0, y0) outputted from the normalization processing section 802 and the noise estimate N(P'(x0, y0)) outputted from the noise estimate calculation section 803.

To be more specific, in the case of |P(x0, y0)−P'(x0, y0)|<N (P'(x0, y0)), the coring processing section 804 regards P'(x0, y0) as the final output pixel value Po(x0, y0). Furthermore, in the case of P(x0, y0)−P'(x0, y0)≧N(P'(x0, y0)), the coring processing section 804 regards P(x0, y0)−N(P'(x0, y0)) as the final output pixel value Po(x0, y0). On the other hand, in the case of P(x0, y0)−P'(x0, y0)≦−N(P'(x0, y0)), the coring processing section 804 regards P(x0, y0)+N(P'(x0, y0)) as the final output pixel value Po(x0, y0).

Here, an operational aspect of the configuration of the above described noise reduction section 102 will be described.

The bilateral filter as the edge-preserving smoothing filter used for the configuration of the noise reduction section 102 is a filter having a frequency characteristic which differs depending on the structure of the image region applied as shown, for example, in FIG. 3.

Such a variation of the frequency characteristic is caused by a weight of the bilateral filter obtained by the brightness difference. That is, when the pixel where the value obtained by dividing the absolute value of the brightness difference by $\sigma_d$ (value of |brightness difference|/$\sigma_d$) is a value greater than 1 is located in the extraction region to be subjected to smoothing processing (region defined by the number of filter taps, and a region made up of 5×5 pixels in size in the aforementioned explanation), the value of the Gaussian function takes a value close to 0, and therefore the pixel is substantially excluded from the pixels used to perform smoothing processing.

With such nature, even when the pixel to be processed is located on an edge boundary, if it is an edge where the brightness difference from the pixel peripheral to the pixel to be processed is large, the pixel located in the direction orthogonal to the edge direction does not join the smoothing processing, and it is thereby possible to obtain a filter capable of saving a spatial frequency band of the edge section.

On the other hand, in the case of a micro structure region where a brightness difference between a pixel to be processed and a pixel peripheral to the pixel to be processed is small, that is, the value obtained by dividing the absolute value of the brightness difference by $\sigma_d$ (value of |brightness difference|/$\sigma_d$) is a value smaller than 1, the value of the Gaussian function is a value close to 1, and therefore all pixels including the micro structure region are used for smoothing processing. In such a case, the frequency characteristic of the smoothing filter becomes closer to the low pass filter of the characteristic determined by another Gaussian function concerning the spatial distance of the bilateral filter.

Therefore, the magnitude of the parameter $\sigma_d$ with respect to the absolute value of the brightness difference of the bilateral filter becomes a predominant element as to whether or not the micro structure of the image can be maintained. That is, setting $\sigma_d$ as a relatively small value makes it possible to retain a micro structure corresponding to a region where the absolute value of the brightness difference is relatively small. However, in such a case, when the absolute value of the brightness difference comes to have magnitude corresponding to the amount of noise (brightness difference obtained by noise being superimposed), the variation by noise causes the value obtained by dividing the absolute value of the brightness difference by $\sigma_d$ (value of |brightness difference|/$\sigma_d$) to change considerably, and thereby has a large influence on the filter coefficient.

FIG. 9A to FIG. 9C, and FIG. 10A to FIG. 10C are drawings schematically illustrating the aforementioned explanation. Shading of each cell in FIG. 9A and FIG. 10A visually expresses a difference in the difference value (the darker the color, the larger the difference value). Furthermore, shading of each cell in FIG. 9B, FIG. 9C, FIG. 10B and FIG. 10C visually expresses a difference in the filter coefficient (weight of a blank cell is greater).

FIG. 9A schematically illustrates the difference value D(x, y) when high frequency noise (amount of noise N) is superimposed on the flat region of 5×5 pixels.

In such a condition, if N≈$\sigma_d$ is assumed, the calculated filter coefficient varies in accordance with the pattern of high frequency noise as shown, for example, in FIG. 9B as the variation of D(x, y)/$\sigma_d$ increases and pixels to be used for smoothing are limited, and it is not possible to obtain a sufficient noise reduction effect as a consequence.

When $\sigma_d$ is reduced down to a value close to the noise level for the purpose of maintaining the micro structure as described above, there is no more noise reduction effect. On the other hand, when $\sigma_d$ is increased, a sufficient noise reduction effect can be obtained, but nonetheless, the micro structure cannot be maintained.

To overcome this reciprocity, according to the noise reduction section 102 of the present embodiment, when the target pixel to be subjected to noise reduction processing and the region image peripheral to the target pixel are judged to be a micro structure region, D'(x, y) is determined by operating a low pass filter for cutting high frequency noise included in the difference value D(x, y). This allows D'(x, y)/$\sigma_d$ to be a value smaller than 1 and makes it possible to obtain all filter coefficients of 5×5 taps as uniform coefficients as shown, for example, in FIG. 9C.

On the other hand, FIG. 10A schematically illustrates the difference value D(x, y) when high frequency noise is superimposed on the extraction region provided with a micro structure (small edge) in the spatially longitudinal direction.

When a filter coefficient is calculated from the difference value D(x, y) corresponding to the micro structure region in FIG. 10A, since pixels to be used for smoothing are limited as shown, for example, in FIG. 10B, this filter coefficient is a filter coefficient whereby any sufficient noise reduction effect cannot be obtained. On the other hand, using D'(x, y) operated by a low pass filter for cutting high frequency noise included in the difference value D(x, y), it is possible to obtain a filter coefficient that can use many pixels existing at pixel positions along the low-frequency micro structure in the longitudinal direction for smoothing as shown, for example, in FIG. 10C.

That is, even if $\sigma_d$ is reduced, it is possible to obtain a coefficient with influences of noise suppressed to a minimum by calculating a difference value D'(x, y) whose frequency band in which many noise components relative to frequency components of the image structure are expected to be included is cut down and then calculating a coefficient of the bilateral filter.

When a frequency band to be emphasized as the structure of an image is known beforehand, a band pass filter for extracting the frequency band may also be operated. In this case, it is also possible to obtain an effective noise reduction result while saving the image structure.

Furthermore, when the number of taps of the low pass filter operating on the difference value D(x, y) cannot be increased as in the case of FIG. 7C, D'(x, y) may be multiplied a predetermined times to obtain the amplitude of the micro structure to be retained or $\sigma_d$ when the low pass filter is not operated may be reduced so as to approximate $\sigma_{dL}$ when the low pass filter is operated.

FIG. 11 is a diagram illustrating a relationship between $\sigma_d$ and $\sigma_{dL}$ and illustrates an example of a case where $\sigma_d$ varies depending on the amount of noise N(R). In this example, $\sigma_{dL}$ (n(R)) during low pass filter processing corresponding to the aforementioned second filter may be set to $\sigma_{dL}(n(R))=\beta\sigma_d(n(R))$ (where $\beta$ is a predetermined constant equal to or below 1). This makes it possible to calculate a coefficient of a more suitable bilateral filter capable of excluding noise influences in a region relatively susceptible to noise such as a micro structure region.

On the other hand, when the region is judged to be a structure region having sufficient edge strength, the coefficient of the bilateral filter is not relatively susceptible to noise. Therefore, the noise reduction section 102 of the present embodiment calculates a filter coefficient without applying band restrictions due to filter processing to the difference value D(x, y). This prevents pixels corresponding to a structure with no correlation from being added to smoothing processing, and can thereby reduce noise while maintaining edge preserving performance.

Furthermore, the aforementioned filter coefficient calculation processing is not limited to the bilateral filter and can be likewise used for a filter that uses the difference value D(x, y) to calculate a filter coefficient such as a rational filter.

As described above, the image processing apparatus 110 of the present embodiment calculates a filter coefficient of the bilateral filter using a difference value D'(x, y) as a processing result of applying processing using a low pass filter or band pass filter to the difference value D(x, y) according to the structure of an image region. Thus, according to the image processing apparatus 110 of the present embodiment, it is possible to obtain a high noise reduction effect while maintaining the micro structure as much as possible.

Second Embodiment

Figure 12:
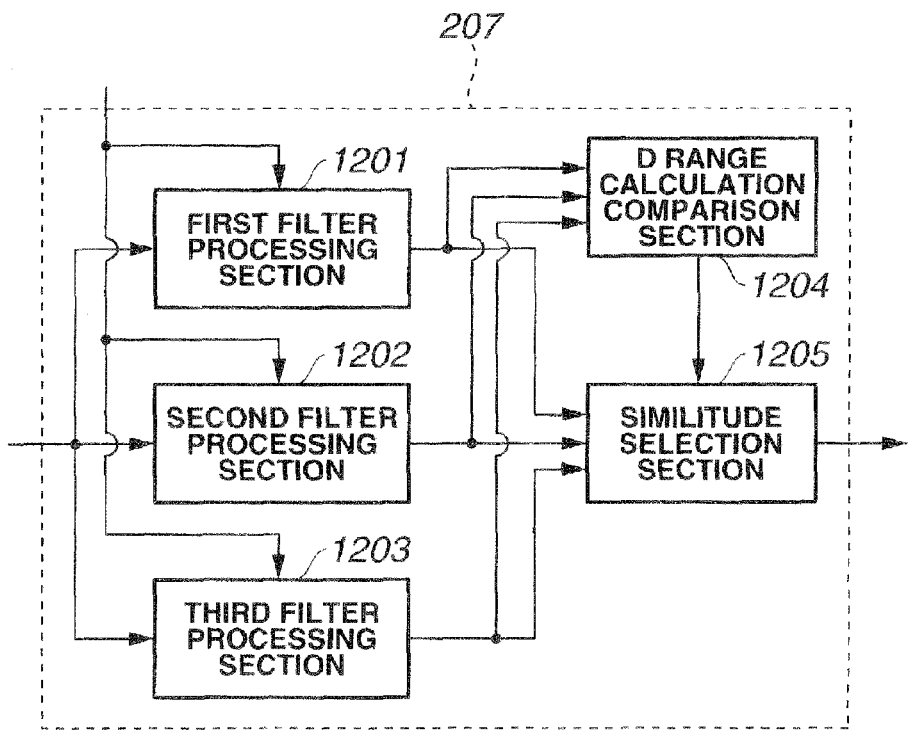
FIG. 12 is a function block diagram illustrating an example of a specific configuration of a difference extraction region filter processing section according to a second embodiment of the present invention.
Figure 14:
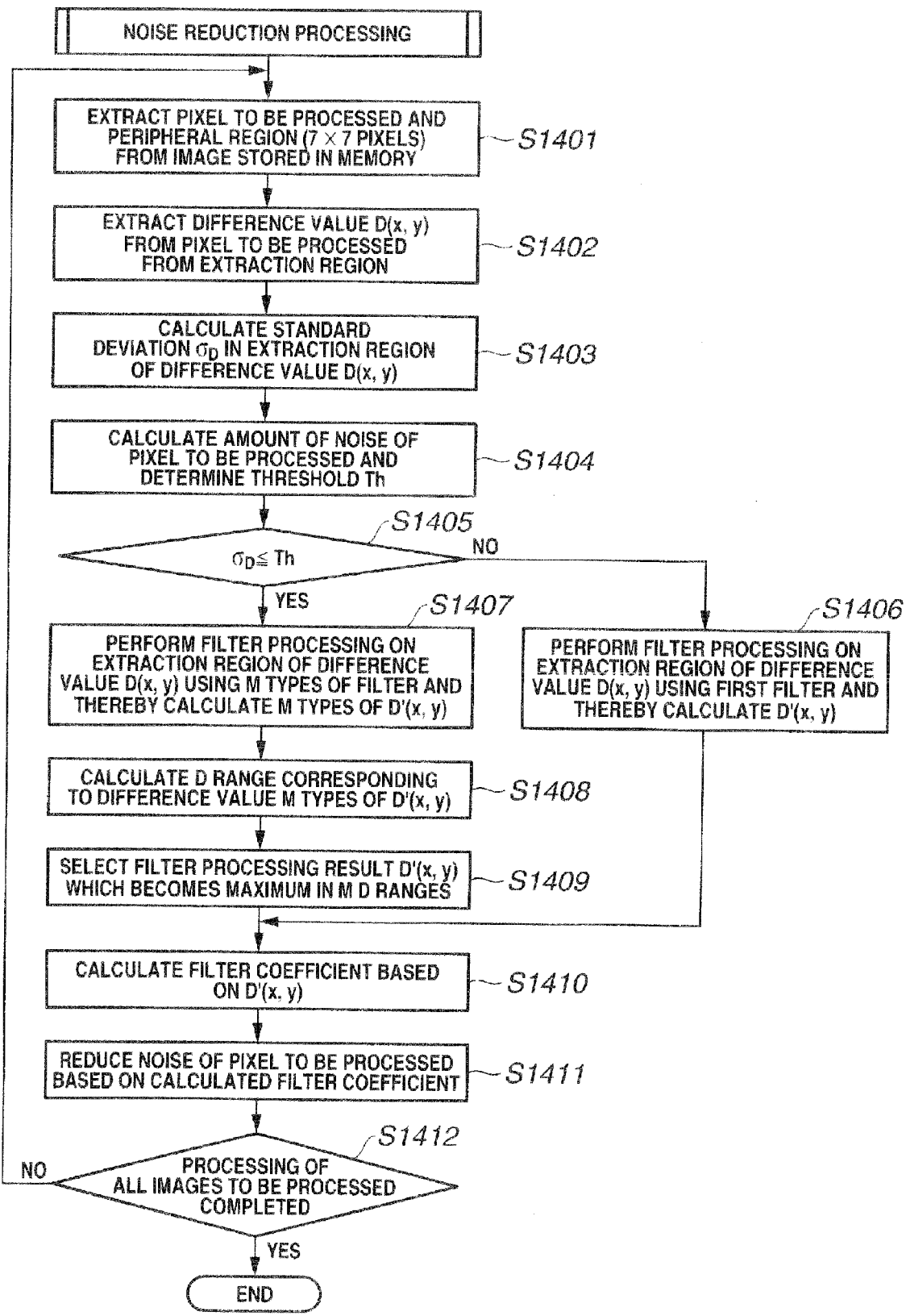
FIG. 14 is a flowchart illustrating a processing procedure for noise reduction processing in the configuration provided with the difference extraction region filter processing section in FIG. 12.

FIG. 12 to FIG. 14 are related to a second embodiment of the present invention. FIG. 12 is a function block diagram illustrating an example of a specific configuration of a difference extraction region filter processing section according to the second embodiment of the present invention. FIG. 13A is a diagram illustrating an example of filter coefficients used in the difference extraction region filter processing section in FIG. 12. FIG. 13B is a diagram illustrating an example different from FIG. 13A of filter coefficients used in the difference extraction region filter processing section in FIG. 12. FIG. 13C is a diagram illustrating an example different from FIG. 13A and FIG. 13B of filter coefficients used in the difference extraction region filter processing section in FIG. 12. FIG. 13D is a diagram illustrating an example different from FIG. 13A, FIG. 13B and FIG. 13C of filter coefficients used in the difference extraction region filter processing section in FIG. 12. FIG. 13E is a diagram illustrating an example different from FIG. 13A, FIG. 13B, FIG. 13C and FIG. 13D of filter coefficients used in the difference extraction region filter processing section in FIG. 12. FIG. 14 is a flowchart illustrating a processing procedure for noise reduction processing in the configuration provided with the difference extraction region filter processing section in FIG. 12.

In the following explanations, detailed descriptions of components similar to those in the first embodiment will be omitted. Furthermore, the configuration of the noise reduction section of the present embodiment has a configuration similar to that of the noise reduction section 102 according to the first embodiment. Therefore, suppose parts different from those of the noise reduction section 102 in the first embodiment will be mainly described in the present embodiment. To be more specific, processing contents of the filter coefficient selection section 206 and the difference extraction region filter processing section 207 in the present embodiment are different from those of the first embodiment, and therefore these processing contents will be mainly described.

As shown in FIG. 12, the difference extraction region filter processing section 207 is configured by including a first filter processing section 1201, a second filter processing section 1202, a third filter processing section 1203, a D range (dynamic range) calculation comparison section 1204 and a similitude selection section 1205.

Furthermore, according to the difference extraction region filter processing section 207 shown in FIG. 12, a difference value D(x, y) outputted from the difference value calculation section 202 is inputted to the first filter processing section 1201, the second filter processing section 1202 and the third filter processing section 1203 respectively.

On the other hand, the filter coefficient selection section 206 selects a predetermined filter from among five types of filter coefficient groups stored in the filter coefficient table 205 shown, for example, in FIG. 13A to FIG. 13E. The filter coefficient selection section 206 then outputs the selected predetermined filter to the first filter processing section 1201, the second filter processing section 1202 and the third filter processing section 1203 respectively.

The first filter processing section 1201, the second filter processing section 1202 and the third filter processing section 1203 perform filter processing in parallel. Here, suppose the difference value D(x, y) means difference values ($D_{00}$ to $D_{66}$) of the 7×7-pixel region shown in FIG. 7A.

When the filter coefficient selection section 206 selects a predetermined filter from among the five filter coefficient groups stored in the filter coefficient table 205, to be more specific, the following processing is performed.

First, the filter coefficient selection section 206 makes a judgment as to whether a region is a structure region with strong edge strength or a micro structure or a flat section region using the above described judgment method in the first embodiment.

When the region is judged to be a structure region with strong edge strength, the filter coefficient selection section 206 selects the filter coefficients in FIG. 13A and outputs the filter coefficients to the first filter processing section 1201, the second filter processing section 1202 and the third filter processing section 1203 respectively. Therefore, in this case, the three filter processing sections 1201, 1202 and 1203 output the same processing result. Therefore, for the purpose of omitting unnecessary processing, processing of, for example, the second filter processing section 1202 and the third filter processing section 1203 may be stopped to reduce the output in this case to 0.

On the other hand, when the region is judged to be a micro structure or a flat section region, the filter coefficient selection section 206 selects the filter coefficients in FIG. 13B to be outputted to the first filter processing section 1201, selects the filter coefficients in FIG. 13D to be outputted to the second filter processing section 1202 and outputs all the five types of filter coefficients in FIG. 13A, FIG. 13B, FIG. 13C, FIG. 13D and FIG. 13E to the third filter processing section 1203.

In this case, the first filter processing section 1201 performs smoothing processing in the horizontal direction and outputs Dh'(x, y) as the processing result. Furthermore, the second filter processing section 1202 performs smoothing processing in the vertical direction and outputs Dv'(x, y) as the processing result. Furthermore, the third filter processing section 1203 performs smoothing processing in a radial direction with respect to the center position and outputs Dr'(x, y) as the processing result.

Since the first filter processing section 1201 and the second filter processing section 1202 multiply one type of filter coefficients without depending on the filter processing position, the processing contents are clear without showing details thereof. On the other hand, as for the third filter processing section 1203, the type of filter coefficients needs to be changed by identifying the filter processing position, and therefore details of the processing contents will be shown below.

First, the filter in FIG. 13A is defined as F0(n, m), the filter in FIG. 13B is defined as F1(n, m), the filter in FIG. 13C is defined as F2(n, m), the filter in FIG. 13D is defined as F3(n, m) and the filter in FIG. 13E is defined as F4(n, m). In such a case, Dr'(x, y)=$D_{xy}$' as the filter processing result of difference value D(x, y)=$D_{xy}$ is expressed as equation (11) to equation (35) as follows.

$$D_{11}'=\Sigma_n\Sigma_m F2(n,m)D_{nm}/4 \tag{11}$$

$$D_{12}'=\Sigma_n\Sigma_m\{F2(n,m)+F3(n,m)\}D_{n(m+1)}/8 \tag{12}$$

$$D_{13}'=\Sigma_n\Sigma_m F3(n,m)D_{n(m+2)}/4 \tag{13}$$

$$D_{14}'=\Sigma_n\Sigma_m\{F3(n,m)+F4(n,m)\}D_{n(m+3)}/8 \tag{14}$$

$$D_{15}'=\Sigma_n\Sigma_m F4(n,m)D_{n(m+4)}/4 \tag{15}$$

$$D_{21}'=\Sigma_n\Sigma_m\{F1(n,m)+F2(n,m)\}D_{(n+1)m}/8 \tag{16}$$

$$D_{22}'=\Sigma_n\Sigma_m F2(n,m)D_{(n+1)(m+1)}/4 \tag{17}$$

$$D_{23}'=\Sigma_n\Sigma_m F3(n,m)D_{(n+1)(m+2)}/4 \tag{18}$$

$$D_{24}'=\Sigma_n\Sigma_m F4(n,m)D_{(n+1)(m+3)}/4 \tag{19}$$

$$D_{25}'=\Sigma_n\Sigma_m\{F1(n,m)+F4(n,m)\}D_{(n+1)(m+4)}/8 \tag{20}$$

$$D_{31}'=\Sigma_n\Sigma_m F1(n,m)D_{(n+2)m}/4 \tag{21}$$

$$D_{32}'=\Sigma_n\Sigma_m F1(n,m)D_{(n+2)(m+1)}/4 \tag{22}$$

$$D_{33}'=\Sigma_n\Sigma_m F0(n,m)D_{(n+2)(m+2)} \tag{23}$$

$$D_{34}'=\Sigma_n\Sigma_m F1(n,m)D_{(n+2)(m+3)}/4 \tag{24}$$

$$D_{35}'=\Sigma_n\Sigma_m F1(n,m)D_{(n+2)(m+4)}/4 \tag{25}$$

$$D_{41}'=\Sigma_n\Sigma_m\{F1(n,m)+F4(n,m)\}D_{(n+3)m}/8 \tag{26}$$

$$D_{42}'=\Sigma_n\Sigma_m F4(n,m)D_{(n+3)(m+1)}/4 \tag{27}$$

$$D_{43}'=\Sigma_n\Sigma_m F3(n,m)D_{(n+3)(m+2)}/4 \tag{28}$$

$$D_{44}'=\Sigma_n\Sigma_m F2(n,m)D_{(n+3)(m+3)}/4 \tag{29}$$

$$D_{45}'=\Sigma_n\Sigma_m\{F1(n,m)+F2(n,m)\}D_{(n+3)(m+4)}/8 \tag{30}$$

$$D_{51}'=\Sigma_n\Sigma_m F4(n,m)D_{(n+4)m}/4 \tag{31}$$

$$D_{52}'=\Sigma_n\Sigma_m\{F3(n,m)+F4(n,m)\}D_{(n+4)(m+1)}/8 \tag{32}$$

$$D_{53}'=\Sigma_n\Sigma_m F3(n,m)D_{(n+4)(m+2)}/4 \tag{33}$$

$$D_{54}'=\Sigma_n\Sigma_m\{F2(n,m)+F3(n,m)\}D_{(n+4)(m+3)}/8 \tag{34}$$

$$D_{55}'=\Sigma_n\Sigma_m F2(n,m)D_{(n+4)(m+4)}/4 \tag{35}$$

Suppose n and m in equation (11) to equation (35) above take a value of any one of 0, 1 and 2. Furthermore, suppose $\Sigma_n$ and $\Sigma_m$ in equation (11) to equation (35) indicate the sum totals in the range of values that n and m can take.

Dh'(x, y) as the processing result in the first filter processing section 1201, Dv'(x, y) as the processing result in the second filter processing section 1202 and Dr'(x, y) as the processing result in the third filter processing section 1203 are outputted to the D range calculation comparison section 1204 and the similitude selection section 1205 as a state in which the region of 5×5 pixels centered on x=y=3 is extracted for the 7×7-pixel region in FIG. 7A.

The D range calculation comparison section 1204 obtains maximum values MaxH, MaxV and MaxR and minimum values MinH, MinV and MinR corresponding to three types of 5×5 pixels; Dh'(x, y), Dv'(x, y) and Dr'(x, y) respectively. The D range calculation comparison section 1204 calculates dynamic ranges corresponding to the three types of 5×5 pixels; Dh'(x, y), Dv'(x, y) and Dr'(x, y) by calculating DRh=MaxH−MinH, DRv=MaxV−MinV and DRr=MaxR−MinR respectively. Furthermore, the D range calculation comparison section 1204 compares three dynamic ranges of DRh, DRv and DRr, and thereby outputs filter information of the filter processing section (one of first, second and third filter processing sections) whose dynamic range becomes a maximum to the similitude selection section 1205.

The similitude selection section 1205 selects the corresponding difference values of one type of 5×5 pixels subjected to filter processing out of Dh'(x, y), Dv'(x, y) and Dr'(x, y) based on the filter information from the D range calculation comparison section 1204 and outputs the selection result to the filter coefficient calculation section 209.

The aforementioned processing adopts a configuration in which three types of direction-dependent filter processing are performed in parallel, but it is also possible to adopt a configuration that matches the two-dimensional micro structure of more patterns by further increasing the number of the types thereof. To be more specific, by adding fourth filter processing that processes only F2(n, m) and fifth filter processing that processes only F4(n, m) to the aforementioned three types of filter processing, it is possible to adopt a configuration in which a total of five types of direction-dependent filter processing are performed in parallel.

In the first embodiment, an isotropic low pass filter or a band pass filter is adopted as a filter operating on the difference value D(x, y), whereas in the present embodiment, smoothing processing results in a plurality of directions are acquired through processing using five types of smoothing filters having directionality as shown, for example, in FIG. 13A to FIG. 13E and one smoothing processing result in the direction in which the highest contrast is obtained (edge direction of the micro structure) is then selected from among smoothing processing results in the plurality of directions.

This makes it possible to obtain D'(x, y) in a state in which high frequency noise is reduced while saving the micro structure of the target pixel to a maximum extent, and thereby obtain filter coefficients of the bilateral filter that match the micro edge structure as a consequence.

Here, the processing procedure for the aforementioned noise reduction processing will be described with reference to a flowchart in FIG. 14.

First, a pixel region made up of a pixel to be processed P(x0, y0) and a pixel P(x, y) of a predetermined region peripheral to the pixel to be processed (e.g., 7×7 pixels) is extracted from a single color image stored in the memory (step 1401).

Next, a difference value D(x, y) is calculated between the pixel to be processed P(x0, y0) located in the center of the extracted 7×7-pixel region and the pixel P(x, y) peripheral to the pixel to be processed (step 1402).

Next, a standard deviation $\sigma_D$ is calculated for an extraction region of 7×7 pixels of the difference value D(x, y) (step 1403).

The amount of noise included in the pixel to be processed P(x, y) is estimated and a threshold Th to be used to judge whether or not the difference value D(x, y) of the extraction region is a micro structure region is determined based on the estimated amount of noise (step 1404).

Here, the aforementioned amount of noise can be calculated from a function (or line graph table) that stores the amount of noise (standard deviation) corresponding to the brightness level obtained by measuring the amount of noise generated in the image pickup section 100 as a noise model beforehand and image taking parameters (amount of gain, exposure time and temperature or the like).

Next, a standard deviation $\sigma_D$ of the calculated extraction region is compared with a micro structure region judgment threshold Th (step 1405).

When it is judged in the processing of step 1405 that the threshold Th is equal to or above the standard deviation $\sigma_D$, the extraction region of the difference value D(x, y) obtained through the processing in step 1402 is subjected to filter processing by selecting a first filter that retains the frequency band up to the high frequency component, and D'(x, y) is thereby calculated (step 1406).

On the other hand, when it is judged in the processing of step 1405 that the threshold Th is less than the standard deviation $\sigma_D$, M types of filters are selected for the extraction region of the difference value D(x, y) obtained through the processing in step 1402 and subjected to filter processing respectively, and M types of D'(x, y) are thereby calculated (step 1407). M D ranges corresponding to the M types of difference value D'(x, y) are calculated respectively (step 1408) and a difference value D'(x, y) after the filter processing that corresponds to a maximum D range is then selected (step 1409).

After that, based on the difference value D'(x, y) selected in step 1409, filter coefficients corresponding to the pixel to be processed P(x0, y0) to be subjected to noise reduction processing and a predetermined peripheral region (5×5 pixels) of the pixel to be processed are calculated (step 1410).

By applying filter processing to the pixel P(x0, y0) at the processing target position and the predetermined peripheral region (5×5 pixels) of the pixel to be processed based on the filter coefficients calculated in step 1410, an output pixel value Po(x0, y0) is obtained which corresponds to the pixel P(x0, y0) with reduced noise (step 1411).

When the process in step 1411 is completed, it is judged whether or not processing of all pixels to be processed has been completed (step 1412), and if not completed, a series of processes from step 1401 is repeatedly performed. When processing of all pixels has been completed, the series of noise reduction processes is finished.

Through the above described processing of the present embodiment, it is possible to obtain a sufficient noise reduction effect while retaining the micro structure which has been conventionally crushed in noise reduction carried out using a smoothing filter using a spatial correlation.

Particularly, the above described processing of the present embodiment effectively operates on an image provided with a micro structure without steep edges such as blood vessel, like a medical image, for example, an endoscope image whose object is limited beforehand. That is, according to the above described processing of the present embodiment, weights are given to an important intermediate band out of spatial frequencies and a filter coefficient is calculated using a parameter D'(x, y) with influences of high frequency noise suppressed, and it is thereby possible to reduce noise while retaining micro structures such as blood vessels.

The present invention is not limited to the above described embodiments, and it goes without saying that various modifications and applications are possible without departing from the spirit and scope of the present invention.

What is claimed is:

1. An image processing apparatus comprising:
 a pixel extraction section that extracts an extraction region made up of a target pixel and a plurality of pixels included in a region peripheral to the target pixel;
 a similitude calculation section that calculates a plurality of first similitudes of each pixel value in the peripheral region with respect to a pixel value of the target pixel;
 a similitude filter processing section that performs filter processing on the plurality of first similitudes, and that outputs a plurality of second similitudes subjected to the filter processing;
 a first filter determining section that determines a first filter used in the filter processing of the similitude filter processing section;
 a second filter determining section that determines a second filter used for the extraction region based on the plurality of second similitudes; and
 a noise reduction processing section that performs noise reduction processing on the target pixel based on the second filter determined by the second filter determining section.

2. The image processing apparatus according to claim 1, wherein the plurality of first similitudes are difference values of each pixel value of the peripheral region with respect to the pixel value of the target pixel.

3. The image processing apparatus according to claim 1, wherein the first filter determining section determines the first filter based on a statistical amount of the plurality of first similitudes and an amount of estimated noise of the target pixel.

4. The image processing apparatus according to claim 3, wherein the second filter determining section determines a characteristic parameter of the second filter used for the extraction region based on the first filter determined in the first filter determining section.

5. The image processing apparatus according to claim 4, wherein the characteristic parameter of the second filter is an amount of normalization with respect to the plurality of first similitudes.

6. The image processing apparatus according to claim 1, wherein the second filter determining section determines the second filter so that the greater an absolute value of the plurality of second similitudes, the smaller a weighting factor value becomes.

7. The image processing apparatus according to claim 6, wherein the second filter determined by the second filter determining section is a bilateral filter.

8. The image processing apparatus according to claim 3, wherein the first filter determining section selects a plurality of filter candidates as the first filter used for the filter processing, and wherein the image processing apparatus further comprises a similitude selection section that selects one type of similitude from among a plurality of types of similitude subjected to the filter processing by the plurality of filter candidates.

9. An image processing method comprising:

a pixel extracting step of extracting an extraction region made up of a target pixel and a plurality of pixels included in a region peripheral to the target pixel;

a similitude calculating step of calculating a plurality of first similitudes of each pixel value in the peripheral region with respect to a pixel value of the target pixel;

a similitude filter processing step of performing filter processing on the plurality of first similitudes, and outputting a plurality of second similitudes subjected to the filter processing;

a first filter determining step of determining a first filter used for the filter processing in the similitude filter processing step;

a second filter determining step of determining a second filter used for the extraction region based on the plurality of second similitudes; and a noise reduction processing step of performing noise reduction processing on the target pixel based on the second filter determined in the second filter determining step.

10. The image processing method according to claim 9, wherein the plurality of first similitudes are difference values of each pixel value of the peripheral region with respect to the pixel value of the target pixel.

11. The image processing method according to claim 9, wherein in the first filter determining step, the first filter is determined based on a statistical amount of the plurality of first similitudes and an amount of estimated noise of the target pixel.

12. The image processing method according to claim 11, wherein in the second filter determining step, a characteristic parameter of the second filter used for the extraction region is determined based on the first filter determined in the first filter determining step.

13. The image processing method according to claim 12, wherein the characteristic parameter of the second filter is an amount of normalization with respect to the plurality of first similitudes.

14. The image processing method according to claim 9, wherein in the second filter determining step, the second filter is determined so that the greater an absolute value of the plurality of second similitudes, the smaller a weighting factor value becomes.

15. The image processing method according to claim 14, wherein the second filter determined in the second filter determining step is a bilateral filter.

16. The image processing method according to claim 11, wherein in the first filter determining step, a plurality of filter candidates are selected as the first filter used for the filter processing, and wherein the image processing method further comprises a similitude selecting step of selecting one type of similitude from among a plurality of types of similitude subjected to the filter processing by the plurality of filter candidates.

* * * * *